US011879226B2

(12) United States Patent
Arias-Thode et al.

(10) Patent No.: US 11,879,226 B2
(45) Date of Patent: Jan. 23, 2024

(54) AUTONOMOUS DEPLOYMENT SYSTEM FOR SEAFLOOR DEVICES

(71) Applicant: The United States of America as Represented by the Secretary of the Navy, San Diego, CA (US)

(72) Inventors: Yolanda Meriah Arias-Thode, San Diego, CA (US); Alexander Stevens-Bracy, Chula Vista, CA (US); Bashar Dhurgham Ameen, El Cajon, CA (US)

(73) Assignee: USA as represented by Secretary of the Navy, San Diego, CA (US)

( * ) Notice: Subject to any disclaimer, the term of this patent is extended or adjusted under 35 U.S.C. 154(b) by 280 days.

(21) Appl. No.: 17/538,888

(22) Filed: Nov. 30, 2021

(65) Prior Publication Data

US 2023/0167620 A1 Jun. 1, 2023

(51) Int. Cl.
*E02D 29/00* (2006.01)
*E02D 29/09* (2006.01)
(Continued)

(52) U.S. Cl.
CPC .............. *E02D 29/06* (2013.01); *A01K 61/70* (2017.01); *H01M 8/16* (2013.01); *H01M 2250/10* (2013.01)

(58) Field of Classification Search
CPC .......... E02D 29/06; A01K 61/70; H01M 8/16; H01M 2250/10; B63B 2027/165
See application file for complete search history.

(56) References Cited

U.S. PATENT DOCUMENTS 4,266,500 A * 5/1981 Jurca ...................... B63B 22/20
114/333
5,707,174 A * 1/1998 Garren .................... E02F 5/104
405/164

(Continued)

OTHER PUBLICATIONS

"From 3D-printed tiles to sunken statues: 4 innovative approaches to coral restoration," Web page <https://www.weforum.org/agenda/2020/09/coral-reef-restoration-3d-printed-tiles/>, 1 page, Sep. 8, 2020, retrieved from Internet Archive Wayback Machine <https://web.archive.org/web/20210103101741/https://www.weforum.org/agenda/2020/09/coral-reef-restoration-3d-printed-tiles/> on Jan. 3, 2021.

(Continued)

*Primary Examiner* — Benjamin F Fiorello
(74) *Attorney, Agent, or Firm* — Naval Information Warfare Center, Pacific; Kyle Eppele; Evan Hastings

(57) ABSTRACT

An autonomous deployment system for deploying systems and a method of deploying a seafloor device. The autonomous deployment system includes a release unit, a support frame, a plurality of mats, a hose, a plurality of weighted bands, a gas supply, a waterproof housing, and a timer. The method of deploying a seafloor device includes spooling a plurality of mats in a rolled-up position, each of said plurality of mats comprising a hose, wherein each mat is adjacent to a support frame, submerging the seafloor device in a body of water, releasing the seafloor device from a vessel via a release unit, supplying gas to each hose of the plurality of mats, unfurling each of the plurality of mats from the support frame, sinking the seafloor device to lay on the seafloor. The invention may also include a microbial fuel cell and support weights.

16 Claims, 5 Drawing Sheets

Isometric-view

(51) Int. Cl.
    *H01M 8/16*     (2006.01)
    *A01K 61/70*     (2017.01)

(56) References Cited

U.S. PATENT DOCUMENTS

| | | | |
|---|---|---|---|
| 6,698,376 B2* | 3/2004 | Delahousse | B63B 27/16 |
| | | | 114/51 |
| 6,772,705 B2* | 8/2004 | Leonard | B63G 8/24 |
| | | | 114/333 |
| 6,913,854 B1 | 7/2005 | Alberte et al. | |
| 8,398,334 B1* | 3/2013 | Doyle | E02B 15/04 |
| | | | 405/64 |
| 8,430,601 B1 | 4/2013 | Chadwick et al. | |
| 8,715,867 B1 | 5/2014 | McNeilly | |
| 9,276,283 B1 | 3/2016 | Liu et al. | |
| 9,415,848 B2* | 8/2016 | Jewell | B63G 8/001 |
| 9,496,577 B2 | 11/2016 | Arias-Thode et al. | |
| 10,259,540 B1* | 4/2019 | Rush, III | B63B 35/00 |
| 10,644,341 B2 | 5/2020 | Book et al. | |
| 2008/0038066 A1* | 2/2008 | Renard | F16L 1/20 |
| | | | 405/195.1 |
| 2012/0276418 A1* | 11/2012 | Zhou | H01M 8/16 |
| | | | 429/2 |
| 2018/0097237 A1* | 4/2018 | Chadwick | H01M 4/96 |
| 2020/0303756 A1 | 9/2020 | Higier et al. | |

OTHER PUBLICATIONS

"Hong Kong University Researchers Develop 3d Printed Terracotta Tiles to Restore Coral Reef," Web page <https://3dprintingindustry.com/news/hong-kong-university-researchers-develop-3d-printed-terracotta-tiles-to-restorecoral-reef-176864/>, 1 page, Oct. 6, 2020, retrieved from Internet Archive Wayback Machine <http://web.archive.org/web/20090818144217/ http://www.farmshopstore.com/handtools.html> on Nov. 13, 2021).

"Coral comeback: Reef 'seeding' in the Caribbean," Web page <https://phys.org/news/2013-02-coral-comeback- reefseeding-caribbean.html#google_vignette>, 1 page, Nov. 29, 2021.

\* cited by examiner

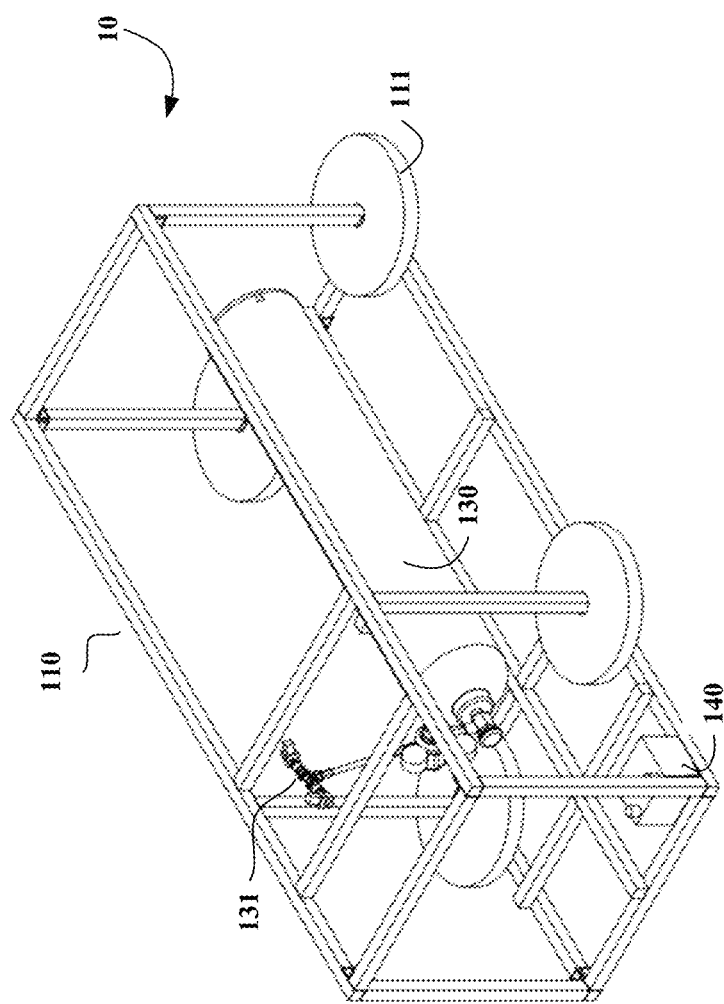
Figure 1A: Isometric-view

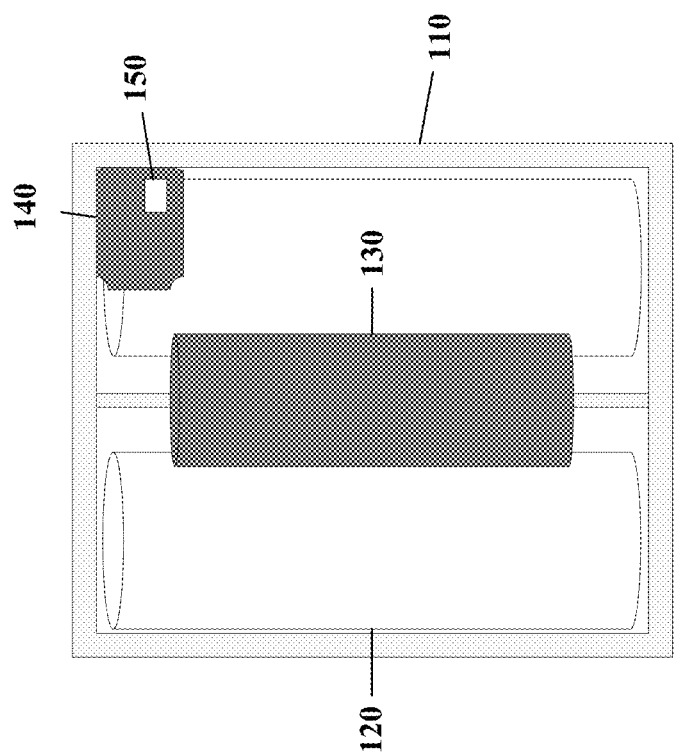
Figure 1C: Top-view
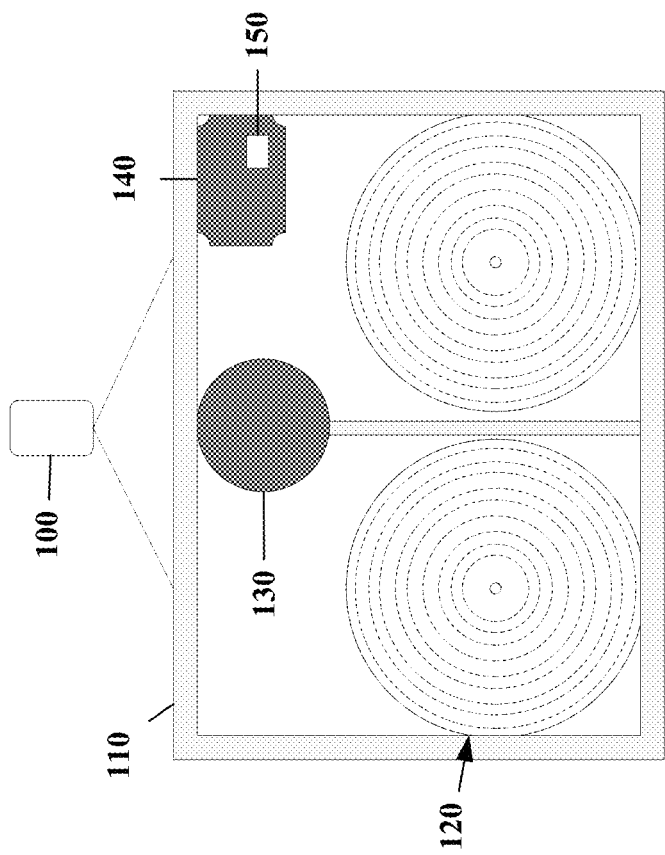
Figure 1B: Side-view

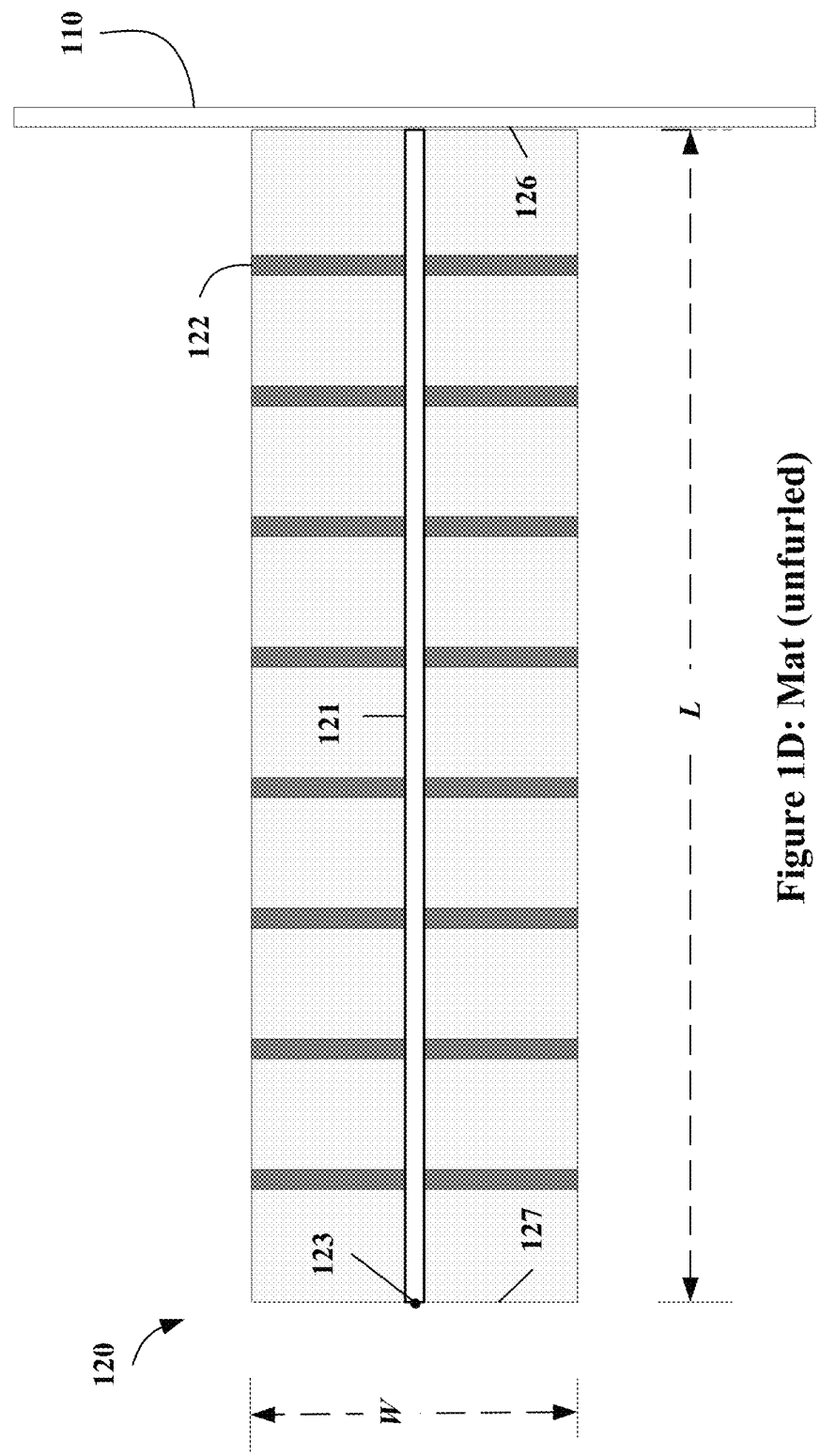
Figure 1D: Mat (unfurled)

AUTONOMOUS DEPLOYMENT SYSTEM FOR SEAFLOOR DEVICES

FEDERALLY-SPONSORED RESEARCH AND DEVELOPMENT

The United States Government has ownership rights in this invention. Licensing inquiries may be directed to Office of Research and Technical Applications, Naval Warfare Information Center, Pacific, Code 72120, San Diego, CA, 92152; telephone (619) 553-5118; email: niwc_patent.fct@us.navy.mil, referencing NC 114,942.

FIELD OF THE INVENTION

The present disclosure pertains generally to the autonomous deployment of devices to the seafloor. More particularly, deploying a system comprising a frame, a gas canister, a plurality of mats, and electronics, which may include deploying microbial fuel cells system.

BACKGROUND OF THE INVENTION

Deploying seafloor devices to optimal seabed locations poses a challenge due to depth and seafloor conditions. Currently, seafloor devices are positioned on the seabed by several techniques, including: divers, weights or gravitational assistance, and vibrational mechanisms. These techniques limit the deployment locations of seafloor devices to littoral zone environments (depths of 3 meters to 33 meters) with generally even seafloors. There is a need for a multi-use deployment system that can autonomously deploy seafloor devices in both the littoral zone and beyond littoral zone environments without diver support.

One such seafloor devices in need of deployment is a microbial fuel cell. Microbial fuel cells offer a viable power source in the marine environment. Microbial fuel cells function through the transport of electrons from bacterial populations as a result of naturally occurring metabolic processes. The bacteria metabolize organic material in sediment on ocean floors, estuaries, and other similar environments. Microbial fuel cells offer great potential as a continuous long term power source for low-power applications because they harness electricity from naturally occurring processes in the marine sediment, which naturally renews its fuel supply.

SUMMARY OF THE INVENTION

According to illustrative embodiments, a seafloor deployment system. Further, a method of deploying a seafloor system. Finally, a method of deploying a seafloor device.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings:

FIG. 1A is an isometric-view of an example of a partial autonomous deployment system for seafloor devices without a plurality of mats.

FIG. 1B is a side-view illustration of an example autonomous deployment system 10 for seafloor devices.

FIG. 1C is a top-view illustration of an example autonomous deployment system for seafloor devices.

FIG. 1D is an illustration of an example of an unfurled mat.

DETAILED DESCRIPTION

Figure 2:
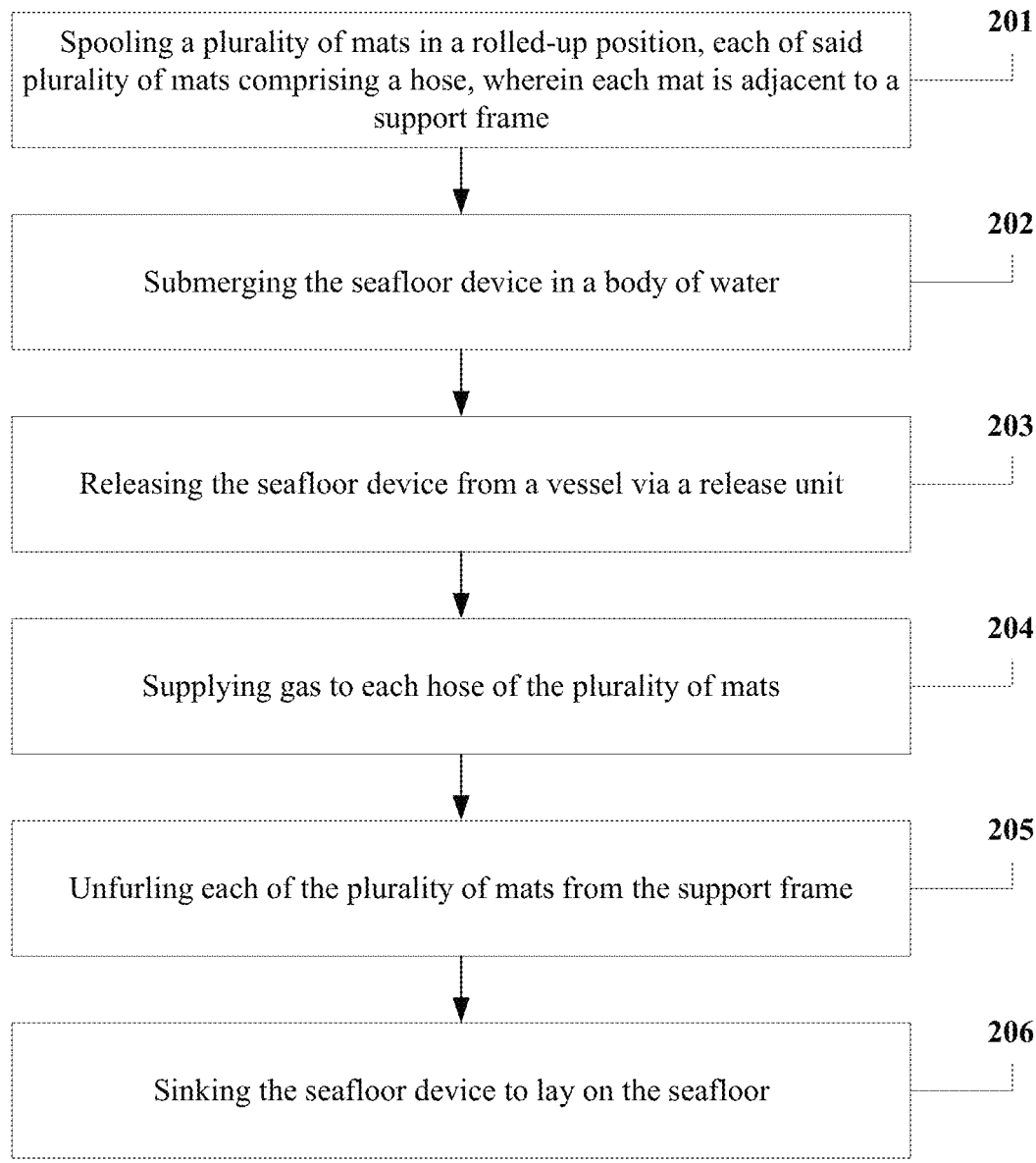
FIG. 2 is an example of flowchart illustrating operations of a method of deploying a seafloor device.

The autonomous deployment system for seafloor devices below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

FIG. 1A is an isometric view of an autonomous deployment system 10 that can deploy seafloor devices to, and beyond, littoral zone environments. There is a need for expanding the possible locations to which seafloor devices can be deployed. Currently, such deployments are limited by a number of factors, including the high pressures experienced at ocean floors and depths safe for divers. This autonomous deployment system 10 may deploy devices at to high-pressure environments and may be deployed without manual assistance from a diver. Autonomous deployments are desired because it is safer for diver personnel, more efficient for the operator, and allows for more deployment locations.

In one embodiment, the autonomous deployment system 10 may include microbial fuel cells. There is a need for deploying microbial fuel cells to the seafloor as a long-term power source for low-power applications. This system enables the deployment of microbial fuel cells to a greater number possible of locations.

In another embodiment, the autonomous deployment system 10 may include the components necessary for the generation of a coral reef, which may include coral reef larvae and nutrients. With the wide-spread losses of coral reefs and increases in ocean acidification, there is a need for seeding new coral reefs. This system allows the autonomous deployment of coral reef regrowth beds.

The support frame 110 provides structural support and for the autonomous deployment system 10. In one embodiment, the support frame 110 is connected to the release unit 100, shown in FIG. 1B, by a rope sufficient to support the weight of the autonomous deployment system 10. The support frame 110 may be constructed of a material that is non-brittle, corrosion resistant, and possess sufficient strength to support the weight of the various components. In one embodiment, the support frame 110 is a rectangular prism. However, it is to be understood that the support from 110 is not limited to rectangular prism geometries. The support frame 110 may take any shape that appropriately supports the system elements and allows for each of the plurality of mats 120, such as are shown in FIG. 1B, to unfurl.

Support weights 111 and may be coupled to the underside of the support frame for sinking the autonomous deployment system 10. Support weights 111 may be composed of any material sufficient to sink the autonomous deployment system 10.

The gas supply 130 is coupled to the support frame 110 for providing gas to the hose 121, shown in FIG. 1D. The gas supply 130 is connected to the hose 121, where the gas flow into said hose 121 is controlled by an intermediate pressure regulator 131. The regulation of the gas pressure into hose 121 relates to the depth of the system's deployment. At greater depths, increased pressure is allowed to unfurl 121 the hose on a higher-pressure sea floor. In one embodiment, the gas pressure to inflate the hose 121 is sufficient unfurl each of the plurality of mats in a littoral-zone environment. In another embodiment, the gas pressure is sufficient unfurl the hose 121 at depths beyond the littoral-zone. For example, a gas pressure of 300 PSI is sufficient to unfurl the mat at a depth of 100 meters. In one embodiment, it is desirable for the pressure regulator 131 to provide a pressure from 250 PSI to 300 PSI.

In one embodiment, the gas supply 130 comprises air. In another embodiment, the gas in the gas supply 130 is an air canister.

The waterproof housing 140 may be composed of coupled to the support frame 110 for housing electronics, which may include a timer 150. The waterproof housing 140 may be composed of a waterproof material suitable of withstanding the high atmospheric pressure at the seafloor. The waterproof housing 140 may be positioned on the support frame 110 to avoid interference with the unfurling of the plurality of mats 120. In one embodiment, it is desirable for the waterproof housing to withstand a pressure of 200 PSI.

FIG. 1B is an example illustration of a side-view of an autonomous deployment system 10 with a plurality of mats 120 in a furled position. In this example illustration, the number of the plurality of mats is two. However, it is to be understood that number of the plurality of mats 120 is not so limited.

The release unit 100 allows for remote detachment of the support frame 110 from a vessel suitable for transporting the autonomous deployment system 10. The vessel may use a crane connected to the release unit 100 for lifting the autonomous deployment system 10 from the vessel and to its deployment location. The release unit 100 separates the autonomous deployment system 10 from a vessel positioned above the deployment location. In one embodiment, the release unit is hydrostatic. In another embodiment, the release unit is connected to the support from 110 by rope with a strength sufficient to support the weight of the autonomous deployment system 10.

Each of the plurality of mats 120 may be composed of a flexible, water-resistant material capable of rolling-up. In one embodiment, the plurality of mats 120 may be composed of silicon. In another embodiment, the plurality of mats 120 may be composed of plastic inflatable mat. Each of the plurality of mats may be bisected with a hose 121 running the length L of each mat. The size of each mat 120 is driven by the desired performance characteristics, which may include the area of seafloor coverage that is desired, as well as the constraints of the support frame 110. In one embodiment, it is desirable that each mat have an area sufficient for a cathode and anode to generate energy as a microbial fuel cell.

The hose 121 bisects the length L of each of the plurality of mats 120 and is fixed to each mat 120. The hose 121 is inflatable and may receive gas from the gas supply 130. The received gas is regulated by a pressure regulator 131. Prior to deployment, the hose 121 is furled with each of the plurality of mats 120. As the hose 121 is inflated, the hose 121 causes the plurality of mats 120 to unfurl due to their increasing rigidity. Near the distal end 127 of each the plurality of mats 120, each hose 121 has a pin hole 123 to evacuate air from the hose.

The hose 121 may be composed of a flexible, water-proof material that is capable of inflation. In one embodiment, the hose 121 may contain at pressure up to 300 PSI.

FIG. 1C is an example illustration of a top-view of an embodiment of the autonomous deployment system 10.

In the embodiment of the deployment system 10 shown in FIGS. 1B and 1C, each of the plurality of mats 120 have two positions: furled and unfurled. The furled position may be utilized during transport of the autonomous deployment system 10 and in the initial stage of deployment. The unfurled position may be triggered by the timer 150. In one example embodiment, the timer 150 initiates inflation of the hose 121 with gas provided by the gas supply 130. As gas flows into the hose 121, the hose 121 stiffens and unfurls each of the plurality of mats 120. Each of the plurality of mats 120 have a proximal end 126 and a distal end 127. The proximal end 126 is coupled to the support frame 110. Each distal end 127 is furled into the center in the rolled-up position, or extended away from the support frame 110 when in the unfurled position. Each of the plurality of mats and capable of laying on the seafloor.

In the embodiment of the autonomous deployment system 10 shown in FIGS. 1B and 1C, the timer 150 is situated inside the waterproofing housing 140. The timer 150 provides a trigger for the release unit 100 to separate the autonomous deployment system 10 from its transport vessel. The timer 150 may be selectively set to trigger the unfurling of the plurality of mats, as determined by the depth at which it is desired mats to be unfurled.

FIG. 1D is a top-view illustration of an example embodiment of an unfurled mat 120, in which, a plurality of weighted bands 122 for sinking the mats are fixed to each of the plurality of mats 120. Each weighted band may be made of a material that can provide sufficient weight for the totality of the plurality of weighted bands to sink the autonomous deployment system 10 to the seafloor. However, it is to be understood that the deployment system is not limited to use in the ocean, but can be deployed in any body of fluid. In one embodiment, the weighted bands 122 run the width W of the mat and are dispersed evenly along on each mat's length L.

The pin hole 123 is located at the distal end of the hose 121. The pin hole 123 allows for the evacuation of air from the hose at a rate slower than the rate at which the gas flows into the hose. The pin hole 123 may be a size sufficient to allow the plurality of mats to unfurl, but the slowly evacuate the gas, once unfurled. The pin hole 123 improves the deployment of the autonomous deployment system because it decreases its buoyancy once the plurality of mats 120 are unfurled.

FIG. 2 is a of flowchart illustrating operations of a method of deploying a seafloor device. One step 201 provides for spooling a plurality of mats in a rolled-up position, each of said plurality of mats comprising a hose, wherein each mat is adjacent to a support frame. Another step 202 provides for submerging the seafloor device in a body of water. Another step 203 provides for releasing the seafloor device from a vessel via a release unit. Another step 204 provides for supplying gas to each hose of the plurality of mats. Another step 205 provides for unfurling each of the plurality of mats from the support frame. Another step 206 provides for sinking the seafloor device to lay on the seafloor.

Figure 3:
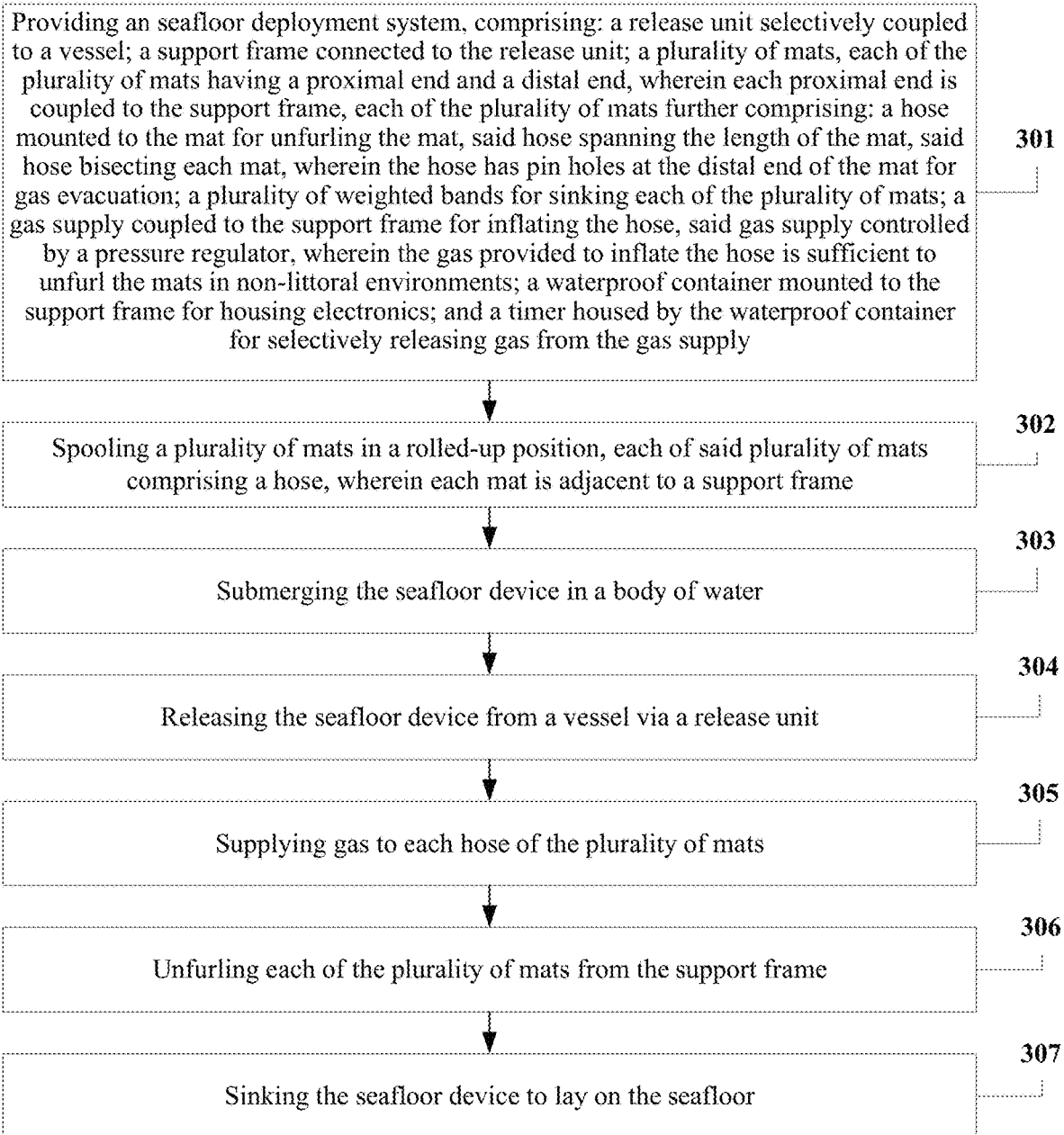
FIG. 3 is a flowchart illustrating operations of a method of method of deploying a seafloor system.

FIG. 3 is a flowchart illustrating operations of a method of method of deploying a seafloor system. One step 301 provides for providing an seafloor deployment system, comprising: a release unit selectively coupled to a vessel; a support frame connected to the release unit; a plurality of mats, each of the plurality of mats having a proximal end and a distal end, wherein each proximal end is coupled to the support frame, each of the plurality of mats further comprising: a hose mounted to the mat for unfurling the mat, said hose spanning the length of the mat, said hose bisecting each mat, wherein the hose has pin holes at the distal end of the mat for gas evacuation; a plurality of weighted bands for sinking each of the plurality of mats; a gas supply coupled to the support frame for inflating the hose, said gas supply controlled by a pressure regulator; a waterproof container mounted to the support frame for housing electronics; and a timer housed by the waterproof container for selectively releasing gas from the gas supply. Another step 302 provides for spooling a plurality of mats in a rolled-up position, each of said plurality of mats comprising a hose, wherein each mat is adjacent to a support frame. Another step 303 provides for submerging the seafloor device in a body of water. Another step 304 provides for releasing the seafloor device from a vessel via a release unit. Another step 305 provides for supplying gas to each hose of the plurality of mats. Another step 306 provides for unfurling each of the plurality of mats from the support frame. Another step 307 provides for sinking the seafloor device to lay on the seafloor.

We claim:

1. An seafloor deployment system, comprising:
   a release unit selectively coupled to a vessel;
   a support frame connected to the release unit;
   a plurality of mats, each of the plurality of mats having a proximal end and a distal end, wherein each proximal end is coupled to the support frame, each of the plurality of mats further comprising:
      a hose mounted to the mat for unfurling the mat, said hose spanning the length of the mat, said hose bisecting each mat, wherein the hose has a pin hole at the distal end of the mat for gas evacuation;
      a plurality of weighted bands for sinking each of the plurality of mats;
   a gas supply coupled to the support frame for inflating the hose, said gas supply controlled by a pressure regulator;
   a waterproof housing mounted to the support frame for housing electronics; and
   a timer housed by the waterproof housing for selectively releasing gas from the gas supply.

2. The seafloor deployment system of claim 1, wherein each of the plurality of mats is oxygen impermeable.

3. The seafloor deployment system of claim 2, further comprising:
   an anode layer attached to one side each of the plurality of mats; and
   a cathode layer attached to an opposite side of each of the plurality of mats.

4. The seafloor deployment system of claim 3, wherein the anode layer and the cathode layer compose a microbial fuel cell.

5. The seafloor deployment system of claim 1, wherein the gas supply for inflating the hose unfurls each of the plurality of mats in non-littoral environments.

6. The seafloor deployment system of claim 1, wherein the pressure regulator provides a pressure in the hose from 250 PSI to 300 PSI.

7. The seafloor deployment system of claim 1, wherein each of the plurality of mats have an area from 80 $m^2$ to 120 $m^2$.

8. The seafloor deployment system of claim 1, wherein the plurality of weighted bands are comprised of metal.

9. The seafloor deployment system of claim 1, wherein the plurality of mats are comprised of silicon.

10. The seafloor deployment system of claim 1, wherein the gas supply is comprised of air.

11. The seafloor deployment system of claim 1, where the support frame has a bottom, further comprising:
   support weights fixed to the underside of the support frame.

12. The seafloor deployment system of claim 1, further comprising:
   coral reef larvae attached to each of the plurality of mats for establishing coral reef structures;
   reef supporting nutrients attached to each of the plurality of mats.

13. A method of deploying a seafloor system, comprising:
   providing an seafloor deployment system, comprising:
      a release unit selectively coupled to a vessel;
      a support frame connected to the release unit;
      a plurality of mats, each of the plurality of mats having a proximal end and a distal end, wherein each proximal end is coupled to the support frame, each of the plurality of mats further comprising:
         a hose mounted to the mat for unfurling the mat, said hose spanning the length of the mat, said hose bisecting the mat, wherein the hose has a pin hole at the distal end of the mat for gas evacuation;
         a plurality of weighted bands for sinking each of the plurality of mats;
      a gas supply coupled to the support frame for inflating the hose, said gas supply controlled by a pressure regulator;
      a waterproof housing mounted to the support frame for housing electronics;
      a timer housed by the waterproof housing for selectively releasing gas from the gas supply;
   spooling the plurality of mats in a rolled-up position, each of said plurality of mats comprising a hose, wherein each mat is adjacent to a support frame;
   submerging the seafloor device in a body of water;
   releasing the seafloor device from a vessel via a release unit;
   supplying gas to each hose of the plurality of mats;
   unfurling each of the plurality of mats from the support frame; and
   sinking the seafloor device to the seafloor.

14. The method of claim 13, wherein each of the plurality of mats is oxygen impermeable.

15. The method of claim 13, wherein the gas supply for inflating the hose unfurls each of the plurality of mats in non-littoral environments.

16. The method of claim 13, wherein the pressure regulator provides a pressure in the hose from 250 PSI to 300 PSI.

* * * * *